United States Patent Office 2,917,327
Patented Dec. 15, 1959

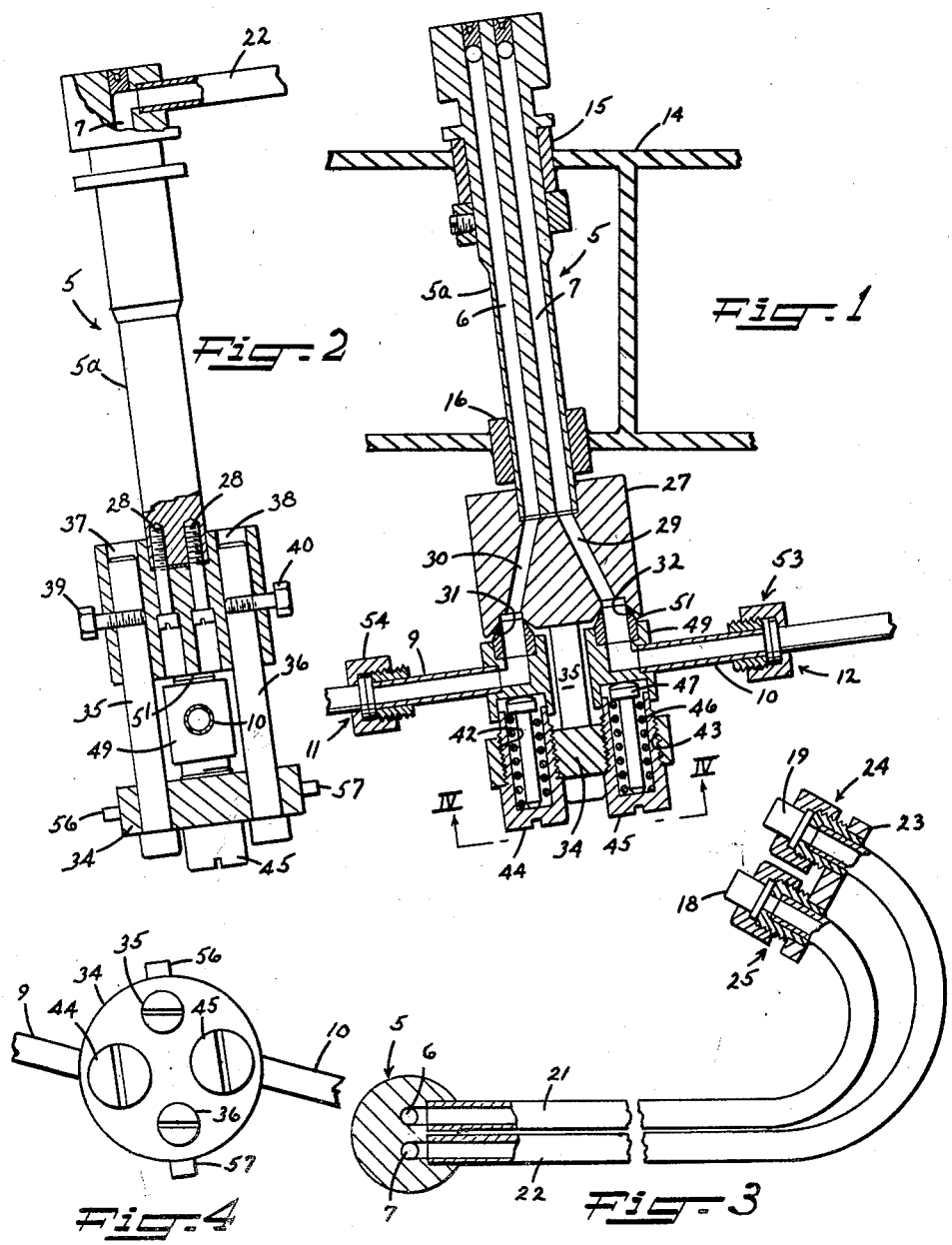

2,917,327

MULTIPLE DUCT CONDUIT SWIVEL ASSEMBLY

Henry J. McDermott, Collingdale, and Christel Pistor, Drexel Hill, Pa., assignors to American Viscose Corporation, Philadelphia, Pa., a corporation of Delaware Application December 30, 1954, Serial No. 478,692

4 Claims. (Cl. 285—61)

The present invention relates to a fluid-conducting system comprising a multiple passageway member and single passageway ducts connected therewith. The invention has particular applicability to apparatus for spinning yarn from liquid filament-forming materials and apparatus for spinning a plurality of yarns from a single position at which a plurality of spinnerets have a common mounting for support in closely-adjacent relatively rigid relationship.

Conventional arrangements for joining a plurality of single passageway ducts with a multiple-passageway member have not proved satisfactory for the spinning of viscose yarn because of the necessity for providing rotatability of the multiple-passageway member while at the same time having the viscose-conducting system completely free of stagnant areas in which the viscose would have a tendency to thicken or harden. Moreover, on account of the need for allotting a minimum of space to such equipment, rigid connections between a rotatable multiple-passageway member and single-passageway members connected thereto are not acceptable because of the necessity for large sections of the single passageway ducts having to rotate with the multiple-passageway member.

Thus, an important object of the present invention is to provide a multiple-duct system comprising a rotatable multiple-passageway member and non-rotatable single-passageway members connected therewith for continuous, stagnant free passage of fluid through the separate ducts of the system as a whole. It is a specific object to provide a rotatable multiple-passageway mounting for a plurality of spinnerets, each having a separate supply passageway and adapted to handle a rapidly congealable liquid, such as a viscose solution. Other objects, features, and advantages will be apparent from the following description of the invention and the drawing relating thereto in which Fig. 1 is a fragmentary view of apparatus illustrating fluid-conducting portions thereof in section;

Fig. 2 is right side view of fluid-conducting apparatus shown in Fig. 1, with portions thereof shown in section;

Fig. 3 is a view of a spinneret supporting assembly and the connection thereof with the apparatus shown in Figs. 1 and 2, with portions thereof shown in sections; and Fig. 4 is an end view of the apparatus illustrated in Fig. 2.

In general, the invention relates to apparatus for conducting separate streams of fluid without the possibility of their intermingling and comprises a rotatable member having a plurality of fluid-conducting passageways or bores extending longitudinally therethrough in a direction generally parallel with its axis of rotation, a support for the member providing a journal within which the member is rotatable, and hollow connectors which constitute terminal portions of separate single-passageway ducts which are held by portions of the member with a port or opening of each connector in contiguous relation with a passageway of the member. The connectors are individually pivotable with respect to the member, with their passageways extending transversely respective with respect to the passageways of the member with which they are connected to form the separate ducts. It will be understood, of course that the multiple passageway member may comprise one or more pieces with a plurality of passageways formed therein by drilling, casing, etc. or it may comprise a plurality of coextensive tubes joined into a single unit having peripheral bearing surfaces.

Referring now to the drawing for more specific description of the invention, and with particular reference to Fig. 1, the apparatus comprises an elongate member 5 having two passageways or bores 6 and 7 extending longitudinally therethrough, and a pair of connectors 9 and 10 which are terminal portions of single-passageway ducts 11 and 12. The member 5 is rotatable with respect to a holder, such as the frame 14 which has bearings 15 and 16 in journaled relation with exterior surfaces of the member 5.

For purposes of illustration, the apparatus of the present invention is herein described as a portion of equipment for spinning viscose yarn. Thus, the apparatus of the embodiment illustrated comprises spinnerets 18 and 19 connected in communication with passageways 6 and 7, respectively, by a pair of tubes 21 and 22 which are connected with an end portion of the member 5 and extend away therefrom in a direction that is radial with respect to its longitudinal axis. The tubes 21 and 22 are connected to the member 5 as by welding or soldering. Preferably, the tubes are connected by cross ties, such as the bridge or tie block 23, supported near the spinnerets and rendering their support more rigid. Such a bridge also fixes the spacial relationship of the spinnerets. The spinnerets are secured to the tubes by conventional couplings 24 and 25.

The member 5 has a head portion, in which the connectors 9 and 10 are supported, comprising a block 27 which is bolted to the elongate cylindrical section 5a by a pair of cap screws 28. The block 27 has passageways 29 and 30 which extend from conical bearing surfaces 31 and 32 into centered contiguous connection with the passageways 6 and 7. The head portion of the member 5 further comprises a bearing plate or cap 34 which is supported in axially-spaced relation with the block 27 by a pair of pins or posts 35 and 36 extending into spaced parallel bores 37 and 38 formed in the block. The pins are anchored within respective bores by cap screws 39 and 40.

When the cap is thus aligned and supported relative to the block 27, a pair of spaced threaded bores 42 and 43 are coaxially aligned with the bearing surfaces 31 and 32. These threaded bores are provided for receiving a pair of hollow cap screws 44 and 45. Each cap screw is adapted to receive a spring 46 and a thrust element or tappet 47 with the stem of the tappet extending internally of the spring with its head being engaged by an end thereof.

Supported between the head portion of the thrust element 47 and the opposing bearing surfaces 31 and 32 of the block 27 are the generally drum shaped portions of the connectors 9 and 10. Using connector 10 by way of example, the drum portion 49 is recessed at one end to receive the annular end portion of the cap screw 45 and the head portion of the tappet 47. The cap screw fits the recess with close clearance to provide a good bearing, especially when radial loads are applied, for holding the drum portion 49 in axial alignment with the cap screw and the bearing surface 32. The spring 46 urges the plunger into tight engagement with the bottom of the recess of the drum to insure seating of the bearing element 51 with the surface 32. The bearing element 51 comprises, preferably, a hard material, such as hardened stainless steel, and is more sharply conical than the surface 32 so as to be self-centering with respect to that surface. The connectors 9 and 10 may be joined to different supply tubes 11 and 12 by couplings 53 and 54. In an arrangement such as shown, tubes 11 and 12 would extend toward the apparatus illustrated in Fig. 1 from opposite directions and would necessarily have to be flexible to a small extent to permit rotation of the double duct member.

When used as apparatus for the spinning of viscose yarns, the double duct member is rotatable to transfer the spinnerets 18 and 19 between a normal spinning position within a spinning bath and a position outside a spinning bath. As shown in Fig. 4, the range of rotative movement of the member is about 200°, during which the connectors 9 and 10, and the ducts attached thereto, undergo practically no rotative movement and the double-duct member 5 rotates relatively thereto. The connectors, of course, allow shifts of position which are readily absorbed by a flexible material constituting the ducts 11 and 12. The ducts may be fabricated from flexible plastic materials such as polyethylene, and polymers of vinyl chloride and vinylidene chloride which may be reinforced, if desired, with a metallic material. When the ducts 11 and 12 are of sufficient length and extend in a curve to provide flexibility, they may be constituted of metals such as stainless steel, copper and nickle. A pair of lugs 56 and 57 are provided along the periphery of the head piece 34 for receiving a crank used in rotating the assembly from one position to another.

While a preferred embodiment of the invention has been shown and described, it is to be understood that changes and variations may be made without departing from the spirit and scope of the invention as defined in the appended claims.

We claim:

1. Apparatus for conducting separate streams of fluid comprising a rotatable member having a plurality of passageways extending therethrough, means for rotatably supporting the member with respect to an axis extending approximately parallel to the passageways, said member comprising an elongate portion of relatively thin cross section in which the passageways extend in generally parallel and closely spaced relationship, and a second portion of relatively thick cross section in which the passageways continue from the elongate portion in diverging relationship relative to each other and terminate in annular bearing surfaces each having an axis approximately parallel to the longitudinal axis of the member, the member having a cap portion spaced axially from said second portion, and means for holding the cap portion in fixed axial alignment with the remainder of the member, a screw element in spaced coaxial relation with each of said bearing surfaces and extending through the cap portion in threaded relation therewith, said screw element being adjustable longitudinally of its axis, a connector constituting the terminal portion of a duct for each passageway of the member disposed between one of said bearing surfaces and the screw element in coaxial relation therewith, and means comprising a compression spring supported in a state of compression between said element and the connector for holding the connector in sealed relation with the adjacent bearing surface.

2. Apparatus as defined in claim 1 wherein said second member portion is readily separable from said elongate member portion, means for connecting the elongate member portion to the second member portion, and means for connecting the cap portion to the second member portion.

3. Apparatus as defined in claim 2 wherein the means for connecting the cap portion to the second member portion comprises posts extending parallel to the axes of the connectors and in radially off-set relation with respect to the axis of the member.

4. Apparatus for conducting separate streams of fluid comprising an elongated rotatable member having a plurality of passageways extending longitudinally therethrough, means for supporting said member for rotation about its longitudinal axis, manipulatable means for rotating said member, bearing surfaces in one end of said member, said bearing surfaces circumscribing the terminals of said passageways, a cap member secured to said one end of said rotatable member for rotation therewith, a plurality of duct connectors for rotatably connecting a duct to each of said passageways, each connector having a bearing surface engaged with one of the bearing surfaces of said rotatable member, a plurality of plungers mounted in said cap member, there being one such plunger for each of said connectors, said plungers being aligned with said connectors, spring means for each of said plungers for urging said plungers against said connectors and urging the bearing surfaces of said connectors into engagement with the bearing surfaces of said rotatable member, and means for individually adjusting the tension in said spring means.

References Cited in the file of this patent

UNITED STATES PATENTS

| 879,845 | Aldrich | Feb. 25, 1908 |
| 1,049,438 | Augustine | Jan. 7, 1913 |
| 1,254,822 | Mannheimer | Jan. 29, 1918 |
| 1,400,465 | Sheriff | Dec. 13, 1921 |
| 1,610,741 | Broidol | Dec. 14, 1926 |
| 1,891,670 | Ernst | Dec. 20, 1932 |
| 2,053,443 | Ringel | Sept. 8, 1936 |
| 2,412,287 | Phillips | Dec. 10, 1946 |
| 2,438,679 | Parker | Mar. 30, 1948 |
| 2,662,785 | Fawick | Dec. 15, 1953 |
| 2,768,843 | Zeilman | Oct. 30, 1956 |

FOREIGN PATENTS

| 15,051 | Great Britain | Sept. 23, 1890 |